United States Patent
Collins et al.

(10) Patent No.: US 8,711,910 B2
(45) Date of Patent: Apr. 29, 2014

(54) OPPORTUNISTIC MODEM

(75) Inventors: Glenn D. Collins, San Jose, CA (US);
Dale R. Flowers, San Jose, CA (US);
Andrew W. Venneman, Sunnyvale, CA (US)

(73) Assignee: Raytheon Applied Signal Technologies, Inc., Sunnyvale, CA (US)

( * ) Notice: Subject to any disclaimer, the term of this patent is extended or adjusted under 35 U.S.C. 154(b) by 135 days.

(21) Appl. No.: 13/404,279

(22) Filed: Feb. 24, 2012

(65) Prior Publication Data

US 2013/0223490 A1    Aug. 29, 2013

(51) Int. Cl.
*H04L 5/16* (2006.01)

(52) U.S. Cl.
USPC ........................................................ 375/222

(58) Field of Classification Search
USPC ........ 375/222, 257; 455/3.02, 12.1, 428, 430; 726/9, 21
See application file for complete search history.

(56) References Cited

U.S. PATENT DOCUMENTS

| | | | |
|---|---|---|---|
| 7,068,971 B2 * | 6/2006 | Abutaleb et al. | ............ 455/3.02 |
| 2006/0153313 A1 | 7/2006 | Lee et al. | |

FOREIGN PATENT DOCUMENTS

WO    WO 2011/142634 A2    11/2011

OTHER PUBLICATIONS

Written Opinion of the International Searching Authority for International Application No. PCT/US2013/021076, filed Jan. 10, 2013, Written Opinion of the International Searching Authority mailed Mar. 15, 2013 (5 pgs.).
International Search Report for International Application No. PCT/US2013/021076, filed Jan. 10, 2013, International Search Report dated Mar. 8, 2013 and mailed Mar. 15, 2013 (3 pgs.).

\* cited by examiner

*Primary Examiner* — Khai Tran
(74) *Attorney, Agent, or Firm* — Christie, Parker & Hale, LLP

(57) ABSTRACT

An opportunistic modem (OM) system receives user data at an input port and transmits a modem output signal at an output port. In one aspect the data is initially transmitted over a first carrier in the modem output signal having a first frequency and bandwidth. Subsequently a second carrier having a second frequency and bandwidth is established, initially used to transmit pilot data, and then the user data is divided between the first and second carriers in the modem output signal. In another aspect the data is initially transmitted over a first and a second carrier in the modem output signal having respective first and second frequencies and bandwidths. Subsequently the second carrier is used to transmit pilot data for a period time. After the period of time the second carrier is de-established. In another aspect establishment and de-establishment of carriers is performed in response to detected interference.

49 Claims, 17 Drawing Sheets

OPPORTUNISTIC MODEM

TECHNICAL FIELD

The present disclosure relates generally to satellite modems used at earth stations in modem to satellite transponder to modem digital data communications systems.

BACKGROUND

Communications Satellites are used to transmit information from an uplink earth station to a transponder on the satellite and back down to a downlink earth station. Satellite transponders operate with various overall bandwidths up to about 72 MHz or more at the present time. There are a limited number of transponders on any given satellite (e.g., 40 or more) and given the cost of building and orbiting a satellite, lease or ownership of such transponders is expensive. When one satellite user cannot use the entire bandwidth of a leased transponder, it is desirable to allow others to do so. Present technology allows a plurality of users to share a transponder; however this is done by manually placing radio frequency (RF) carriers at various points in the transponder passband. These carriers are characterized by their center frequencies within the passband of the transponder and their bandwidths and represent the carrier for the modulated (usually digital) signal that a user will transmit over the transponder as a datalink. Present technology requires that a user manually set up his transmitting equipment so that the carrier is located at a specific center frequency of the transponder passband with a given fixed bandwidth. Accordingly, all his corresponding receiving equipment must likewise be manually set up to receive at that precise frequency. Because this manual approach requires that a carrier be, in effect, taken down when moved or adjusted, the manual approach requires a disruption in the flow of data over the datalink. This approach is not flexible, is disruptive and results in waste of expensive resources.

FIG. 1 is a diagram of an exemplar passband 100 (horizontal axis is frequency and vertical axis is signal magnitude) of a prior art communications satellite. As can be seen, only about 50% of the passband is actually used for the transmission of information, while much of it remains unused (i.e., those areas where no modulation is present such as area 102). While portions of unused bandwidth may not be utilized because no requirement for additional bandwidth exists, there are scenarios where a carrier having a bandwidth larger than any unused portion of bandwidth is required, thus giving rise to the need to consolidate and move existing carriers to the extent possible so as to create a space for such a larger bandwidth carrier. Given that the cost of building and placing a communications satellite into orbit is relatively fixed it would be desirable to use as much of the available transponder passband as possible.

OVERVIEW

An opportunistic modem (OM) system receives user data at an input port and transmits a modem output signal at an output port. In one aspect the data is initially transmitted over a first carrier in the modem output signal having a first carrier frequency and bandwidth. Subsequently a second carrier having a second carrier frequency and bandwidth is established, initially used to transmit pilot data, and then the user data is divided between the first and second carriers in the modem output signal. In another aspect the data is initially transmitted over a first and a second carrier in the modem output signal having respective first and second carrier frequencies and bandwidths. Subsequently the second carrier is used to transmit pilot data (and not user data) for a period time. After the period of time the second carrier is de-established. In another aspect establishment and de-establishment of carriers is performed in response to detected interference.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
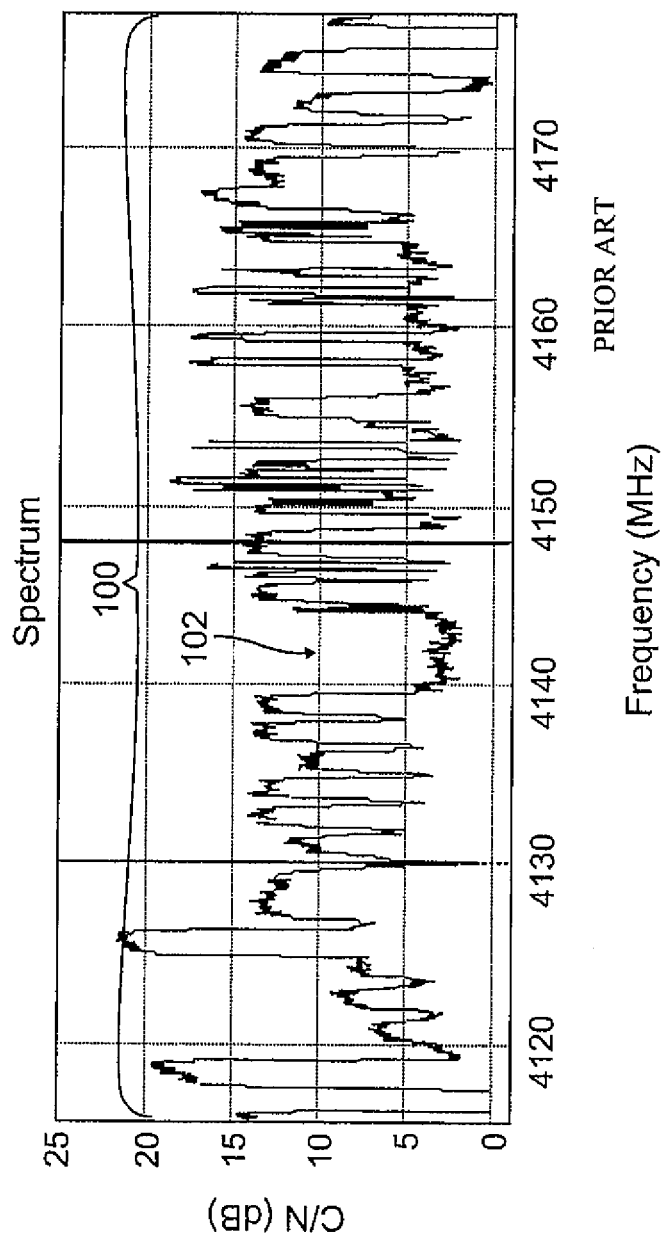
FIG. 1 is a diagram of a passband (horizontal axis is frequency and vertical axis is signal magnitude) of a prior art communications satellite.

Example embodiments are described herein in the context of a model for use with a satellite transponder (or other limited bandwidth communications medium). Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The system described herein provides a modem, such as a satellite modem, that can take advantage of multiple disjoint pieces of transponder spectrum while offering similar features and performance to conventional fixed carrier modems that occupy a single piece of spectrum. The modem is referred to as an "opportunistic modem" because of its ability to take advantage of available unused spectrum within the transponder passband. The modem uses inverse multiplexer (IMUX) technology to divide the digital contents of a data source (also known as "user data") having an associated data rate into multiple lower data rate communication links. The benefits of such a modem include: (1) aggregation of smaller and possibly individually unusable pieces of bandwidth, providing additional utilization of a nominally "loaded" transponder; (2) transponder bandwidth "defragmentation" as the disjoint pieces of bandwidth can be dynamically reconfigured into contiguous pieces without taking down the communications link; (3) dynamic and seamless increase or reduction in data rate and transponder bandwidth; and (4) robustness against interference by dynamically and automatically de-activating pieces of spectrum that have become compromised by interference. Note that as used herein the term "modem" is intended to encompass both symmetric devices which transmit and receive information over a medium as well as more specialized devices which transmit or receive over a medium, i.e., one side has a transmitting "modem" and the other side has a receiving "modem" and the communication only goes one way.

The modem output signal available at the output port of the opportunistic modem system described herein can be applied to operate on one or more transponders on one or more satellites or other transponder carriers (such as aircraft, air ships and the like) and in the presence of predetermined fixed carriers over which it has no control. In essence the opportunistic modem system establishes a number of carriers, transmits data from a data link over those carriers in a multiplex fashion with forward error correction (FEC). Manual and automatic configuration of additional carriers, seamless movement of the data to those carriers and the termination or de-establishment of carriers no longer needed or which are being interfered with are capabilities provided by the opportunistic modem system.

Both half-duplex and full-duplex implementations are supported. In one embodiment, a full-duplex symmetric (FDS) multi-carrier (MC) approach is used. In FDS the carrier(s) in the Tx (transmit) and Rx (receive) IF (intermediate frequency) signals have the same center frequencies, baud rates and modulation types, and the FEC used by the transmitter and the receiver is the same. The Tx and Rx data rates are therefore the same. DoubleTalk®/Carrier-in-Carrier® techniques are supported in this mode. (DoubleTalk is a registered trademark of Raytheon Applied Signal Technology, Inc. of Sunnyvale, Calif. and Carrier-in-Carrier is a registered trademark of Comtech EF Data of Tempe, Ariz.). MC is an approach that relies on multiple, conventional PSK (phase shift keyed)/QAM (quadrature amplitude modulated) carriers carrying digital information. The baud rate(s) and center frequencies for the carriers are selected for compatibility with other existing users (carriers) on a partially loaded transponder.

Figure 2A:
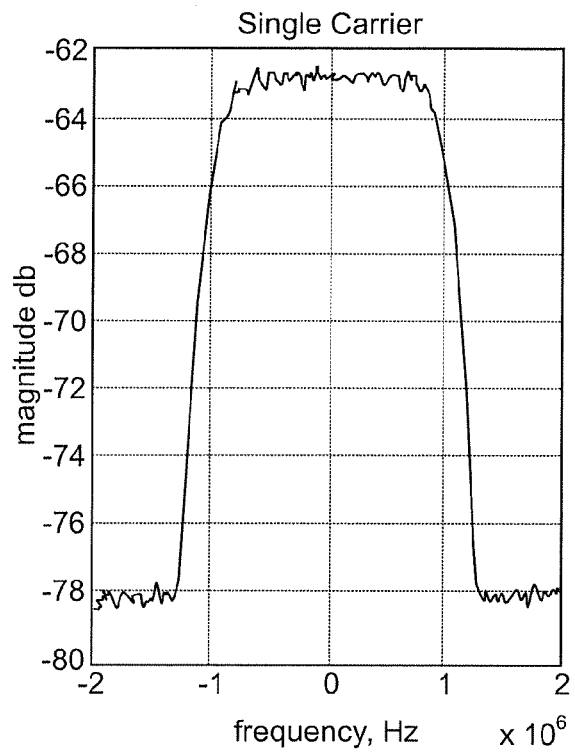
FIG. 2A is an illustration of the spectrum of a conventional single carrier modem.
Figure 2B:
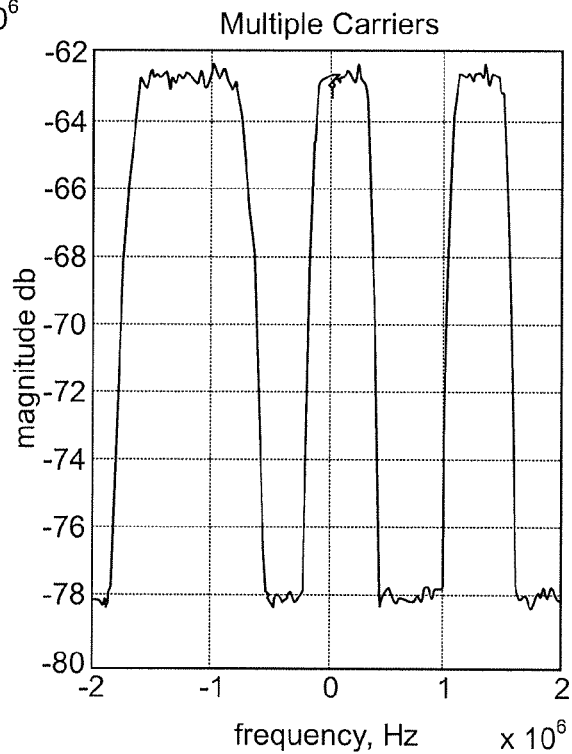
FIG. 2B is an illustration of the spectrum of an equivalent rate multi-carrier modem using the same modulation and FEC.

FIG. 2A is an illustration of the spectrum of a conventional single carrier modem (megahertz on the horizontal axis and signal magnitude (db) on the vertical axis). FIG. 2B is an illustration of the spectrum of an equivalent rate multi-carrier modem using the same modulation and FEC with the data spread over three carriers rather than the single carrier of FIG. 2A. The baud rate and center frequencies of the three carriers illustrated in FIG. 2B are selected to fit between other existing unrelated carriers in the satellite transponder passband which are not shown here.

Figure 3:
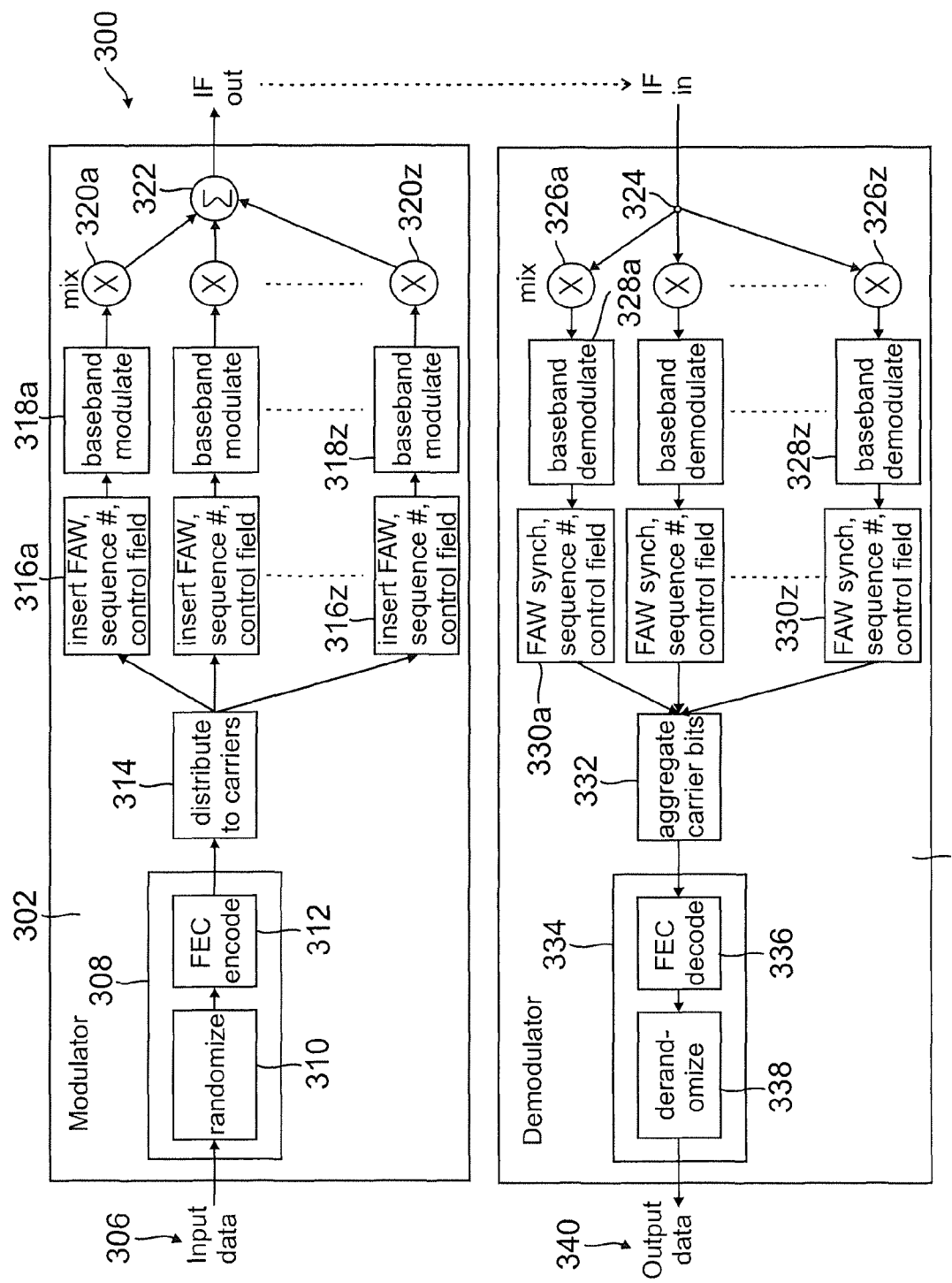
FIG. 3 is a block diagram of a modem illustrating the use of multiple, conventionally modulated, carriers to transport a single logical data stream over multiple discontinuous chunks of spectrum.

FIG. 3 is a block diagram of a modem 300 illustrating the use of multiple, conventionally modulated, carriers to transport a single logical data stream over multiple (potentially) discontinuous pieces of spectrum.

In accordance with the modem 300 of FIG. 3, data input port 306 receives input data on the transmit side which is provided to block 308 where it is randomized at block 310 and FEC (forward error correction) encoded at block 312 and then distributed to all carriers being used by the modem at block 314.

Note that as shown FEC is applied to the aggregate data stream prior to distributing the data to the modulators for the active carriers. This approach yields a system tolerant to the loss of a carrier (e.g., due to interferences). However FEC may be applied to each individual carrier (e.g., before blocks 316a, . . . , 316z) instead of or in addition to applying FEC to the aggregate data stream.

At blocks 316a, . . . , 316z the FAW (frame alignment word) sequence is inserted along with the control field. That data is then passed from blocks 316a, . . . , 316z to corresponding blocks 318a, . . . , 318z where the data is baseband modulated. The resulting data is then mixed at mixers 320a, . . . , 320z and subsequently summed at block 322 and an IF (intermediate frequency) signal (also referred to as a modem output signal) is provided for combination with the carrier for transmission over the transponder. Conversely, the IF data is obtained in a conventional manner for input to demodulator 304 on the receive side where it is split at node 324 into signals going to mixers 326a, . . . , 326z. That data is sent to corresponding baseband demodulators 328a, . . . , 328z and then to corresponding blocks 330a, . . . , 330z where FAW synchronization sequence number and control field are extracted for use in reassembling the data stream. The data is then aggregated as carrier bits at block 332 and sent to block 334 where it is FEC decoded at block 336, derandomized at block 338 and finally output as output data 340 for use at the receive site.

In one embodiment the OM uses two distinct communication channels to seamlessly change carrier configuration settings. The first of these is the configuration channel (see, e.g., the control packet 1000 illustrated in FIGS. 10 and 11 and discussed in more detail below). The configuration channel is used for general communication between the systems. This channel's main contribution is in communicating configuration settings to the remote terminal and to signal to the remote terminal when the flag channel is actively being monitored. The second of these is the flag channel (see FIG. 11, 1014f). The flag channel is time critical and is used as a signal flag to communicate when a pending configuration change becomes active. This communication channel must be able to precisely signal a point in the data stream where a configuration change has taken place. In one embodiment this flag is sent within each transmitted data frame and is broadcast over all active OM carriers. In another embodiment, when adding a new carrier, the new carrier's unused payload bits may be used to augment the flag channel. This can greatly increase the flag channel reliability when adding a new channel. Additionally, when removing a carrier, the unused payload bits of the deactivated carrier may be used as an additional or backup flag channel in the event that the handoff signal was missed. In another approach a single configuration may be used. In accordance with another embodiment, a single configuration channel may be used. This single channel would be used to transfer configuration changes as well as to schedule a frame number or precise time after which the configuration change becomes active. The only additional requirement for such a dual-use channel is that its latency must be taken into account when scheduling a handover point. A handover point is the point in the data stream after which a new carrier configuration is considered active. After the handover point each carrier will operate with an updated frame size and bit distribution map.

The startup and takedown procedures for OM carriers are now described in more detail.

A "signaling segment" is a group of N (N is any integer greater than 0) sequential frames where the first frame in the group has a frame ID that is evenly divisible by N. (The maximum frame ID plus one should also be divisible by N).

A "pilot signal" or "pilot data" is a predetermined sequence of symbols placed in the payload of a carrier while it is not carrying user data.

A "synch word" is a set of symbols present in each frame that is used both as a FAW (frame alignment word) and for signaling a handover point where a new configuration becomes active.

A carrier that is in "lock" has been able to successfully align its frames with the other carriers in the system. This further implies that the FAW has been detected at the expected frame intervals and that the MSE (mean squared error) of the carrier is at an acceptable level.

Carrier Startup Signaling.

A new carrier always starts with the pilot signal inserted into its payload. Signaling is performed by inverting the sync word across all existing carriers and also inverting the pilot signal in the payload of the carrier to be started. This signaling will continue for an entire signaling segment. After the signaling segment each carrier will have its transmitting frame size and bit distribution map updated. The carrier to be added will also have the inverted pilot signal replaced by payload data.

Carrier Takedown Signaling.

Signaling is performed by inverting sync words across all carriers for an entire signaling segment. After the signaling segment each carrier will have its transmitting frame size and bit distribution map updated. The carrier marked for takedown will also have its payload replaced by the pilot signal.

Carrier Startup Handover Conditions.

Any of the following conditions will be considered a handover point after which each carrier's receiver will operate with the updated frame size and bit distribution map parameters:
 1. The inverted sync word was detected with high confidence throughout a signaling segment;
 2. The pilot signal was not detected with high confidence in the new carrier's payload during a signaling segment; and/or
 3. Any carrier loses lock.

Carrier Takedown Handover Conditions.

Any of the following conditions will be considered a handover point after which each carrier's receiver will operate with the updated frame size and bit distribution map parameters:
 1. The inverted sync word was detected with high confidence throughout a signaling segment;

2. The pilot signal was detected with high confidence in the payload of the carrier to be removed during a signaling segment; and/or
3. Any carrier loses lock.

Carrier Startup Procedure.

The OM carrier startup procedure in accordance with a symmetric full duplex case (2 identical carriers). A half-duplex case would not require the steps associated with establishing/deestablishing the Modem B transmitted carrier.

1. Modem A receives a request (e.g., from the bandwidth manager 908 discussed below) to startup (or establish) a new channel with a specified center frequency and bandwidth and:
   a. Begins transmitting a new carrier with the new center frequency and bandwidth. The frame size for the new carrier is chosen such that the frame size is compatible with the current configuration (frame sizes for the carriers are considered compatible if the duration in time to transmit one frame is identical across all carriers. Since each carrier can be operating at a different rate this means that the frame sizes for each carrier can also differ). The initial payload of the new carrier is the pilot signal;
   b. Begins monitoring for a carrier with the new center frequency, bandwidth, and frame size (the frame size is identical to the one determined in 'a' above); and
   c. Sends an asynchronous message to Modem B with the new configuration.
2. Modem B receives the new configuration information and:
   a. Starts transmitting a new carrier with the new center frequency, bandwidth, and frame size. The initial payload of the new carrier is the pilot signal; and
   b. Begins monitoring for a carrier with the new center frequency, bandwidth, and frame size.
3. Once modem A (B) obtains frame lock with the new channel it will:
   a. Send an asynchronous message to modem B (A) requesting carrier startup signaling; and
   b. Begin monitoring for the carrier startup handover conditions.
4. When a modem receives a request for carrier startup signaling it:
   a. Sends the carrier startup signaling; and
   b. On the frame following the signaling segment digital user data will be transmitted across all carriers using the new configuration (and the transmission of the pilot signal will cease).
5. Once a modem detects that one of the carrier startup handover conditions has been met:
   a. The new bit distribution maps and frame size parameters are loaded into all existing carriers for use in receiving all following frames; and
   b. An asynchronous message is sent to the remote modem indicating that the handover was successful.
6. The carrier startup procedure is complete after both modems have confirmed that a successful handover has occurred.

Carrier Takedown Procedure.

The OM carrier takedown procedure in accordance with one embodiment is as follows:

1. Modem A receives a request (e.g., from the bandwidth manager 908 discussed below) to take down (or discontinue) an existing carrier and:
   a. Sends an asynchronous message to modem B with the new configuration information;
   b. Sends an asynchronous message to modem B requesting carrier takedown signaling; and
   c. Begins monitoring for the carrier takedown handover conditions.
2. Modem B receives the new configuration and:
   a. Sends an asynchronous message requesting carrier takedown signaling; and
   b. Begins monitoring for the carrier takedown handover conditions.
3. After modem A(B) receives a request for carrier takedown signaling it:
   a. Sends the carrier takedown signaling; and
   b. After signaling is complete it sends the pilot signal in the payload of the carrier that was marked for takedown (instead of user data) and transmits subsequent frames using the new bit distribution and frame size parameters.
4. Once a modem detects that one of the carrier takedown handover conditions has been met:
   a. The new bit distribution maps and frame size parameters are loaded into all carriers for use in receiving user data; and
   b. An asynchronous message is sent to the remote modem indicating that the handover was successful.
5. A modem will stop transmitting the carrier marked for takedown once all of the following have occurred:
   a. The modem has sent carrier takedown signaling;
   b. The modem detected a carrier takedown handover condition; and
   c. The modem received a message indicating that the remote modem has had a successful handover.

Figure 4A:
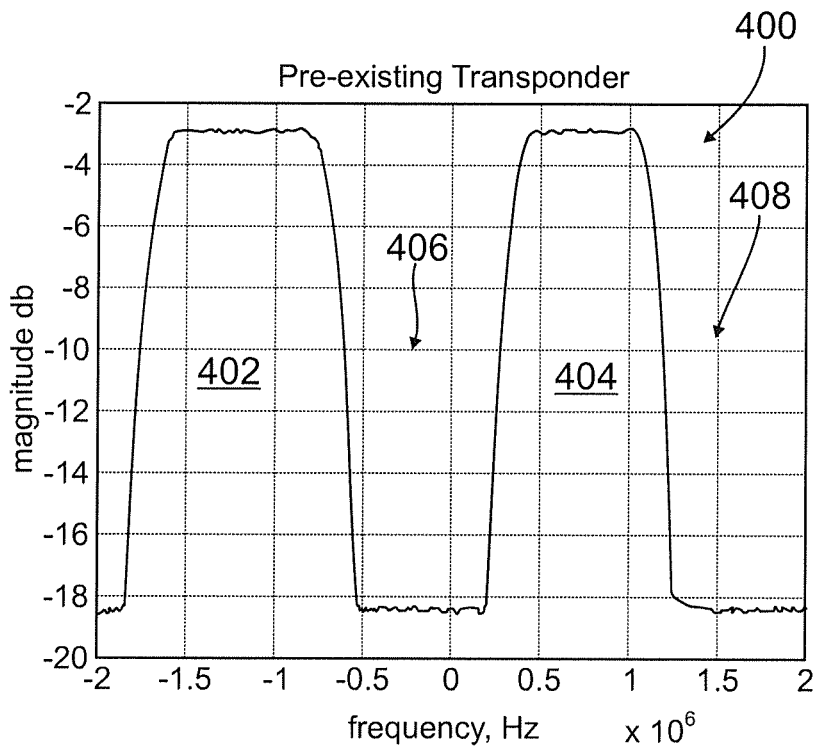
FIG. 4A illustrates a pre-existing transponder spectrum profile comprising a first signal and a second signal with a first unused frequency gap between them and a second unused frequency gap adjacent the second signal.
Figure 4B:
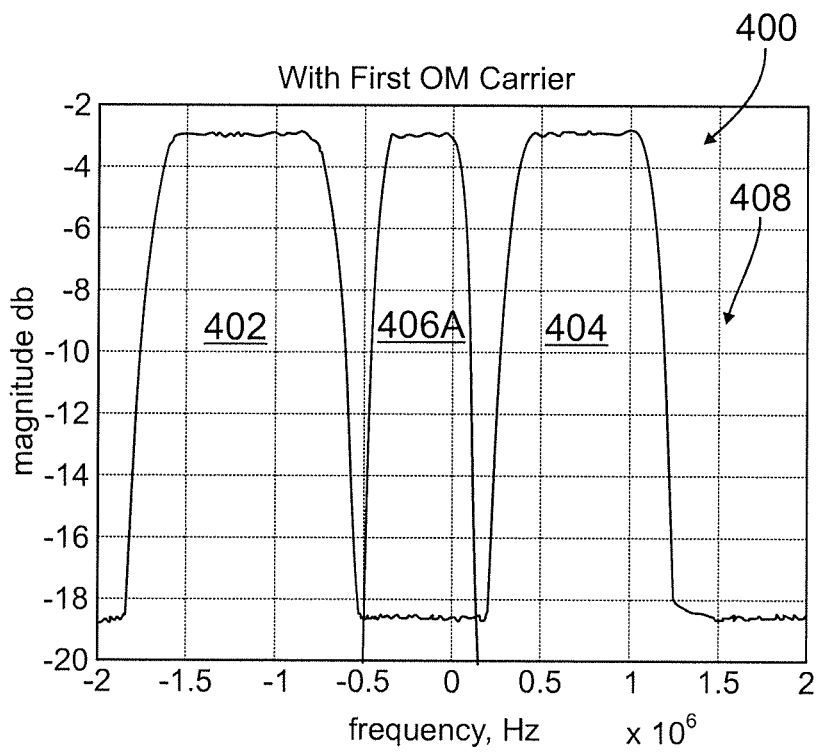
FIG. 4B shows the insertion of a first "OM" or "opportunistic modem" carrier in the first unused frequency gap of FIG. 4A.
Figure 4C:
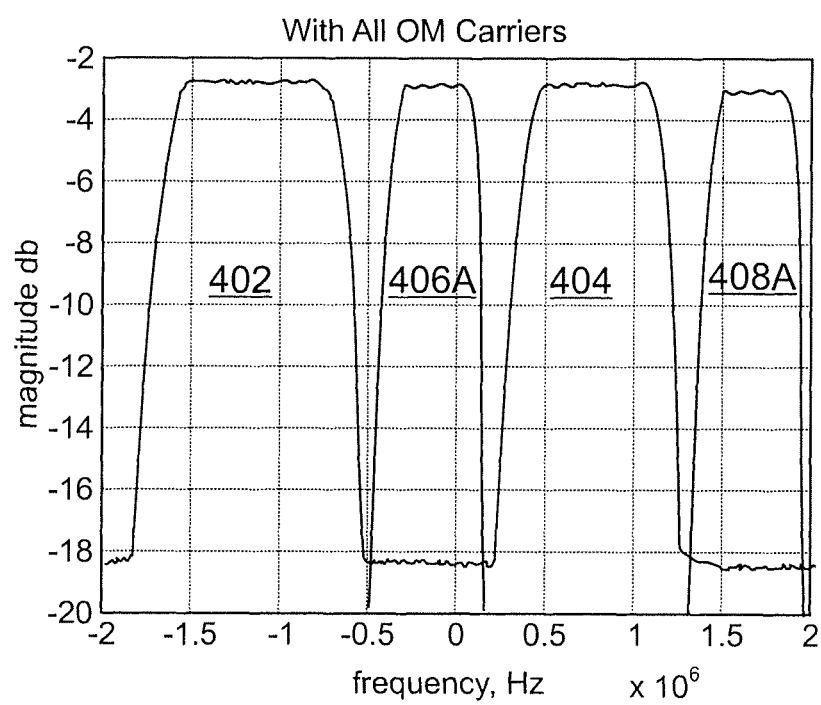
FIG. 4C shows the insertion of a second OM carrier in the second unused frequency gap adjacent the second signal of FIG. 4A.

The opportunistic modem (OM) that forms a part of the present invention is intended to utilize the unused bandwidth of one or more satellite transponder passbands in one or more of a number of approaches. One approach is illustrated in FIGS. 4A, 4B and 4C. In accordance with this approach, the OM exploits two small pieces of transponder bandwidth in order to support a single connection with a higher data rate than would otherwise be possible. FIG. 4A illustrates a pre-existing transponder spectrum profile 400 comprising a first signal 402 and a second signal 404 with a first unused frequency gap 406 between them and a second unused frequency gap 408 (or unused portion of transponder bandwidth) adjacent second signal 404. It is assumed that the signals 402 and 404 belong to pre-existing users of the satellite transponder and are not moveable and may not be interfered with.

FIG. 4B shows the insertion of a first "OM" carrier 406A in the first unused frequency gap 406. As long as the first gap 406 is available and not subject to interference or elimination due to the expansion of the bandwidth used by the 402 and/or 404 signals this bandwidth may be refarmed by the OM modem for use.

FIG. 4C shows the insertion of a second OM carrier 408A in the second frequency gap 408 adjacent the signal 404. As long as that gap is available and not subject to interference or elimination due to the expansion of the bandwidth used by the 404 (or some other) signal this bandwidth may be refarmed by the OM modem for use. The data from a single OM connection may be distributed across multiple OM carriers for retransmission and the re-aggregated at the receiver. Users perceive the operation of a single logical modem despite the signal being spread over multiple carriers.

Upon starting up a new carrier, the system may perform these or similar steps in order to verify proper operation of the new carrier prior to switching data onto that carrier:

1. The MSE (mean-squared error) reported by the demodulator should be below a certain threshold (which may be adjustable in software/firmware).
2. Frame synchronization must be obtained on the pilot signal data received over the new carrier;
3. A valid sequence of frame identification numbers must be detected in the pilot signal data received over the new carrier. The frame identification number is essentially a counter that increments on every frame and is used to synchronize the data received from different carriers.

Similar steps may be performed to verify the continued viability of the carrier, i.e., that it is not being interfered with.

Figure 5A:
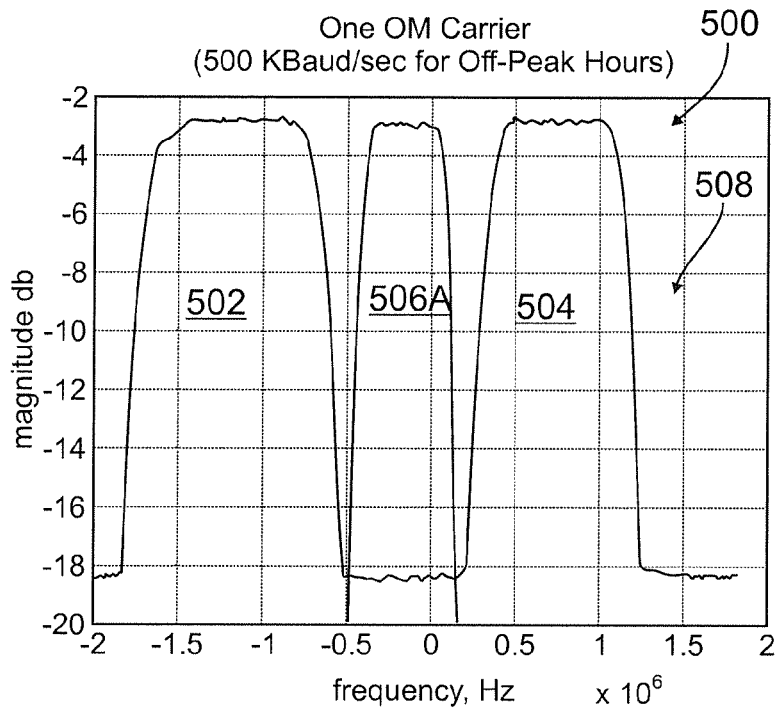
FIG. 5A illustrates a pre-existing transponder spectrum profile comprising a first signal and a second signal with a first unused frequency gap between them filled with an OM carrier as in the previous example and a second unused frequency gap adjacent the second signal.
Figure 5B:
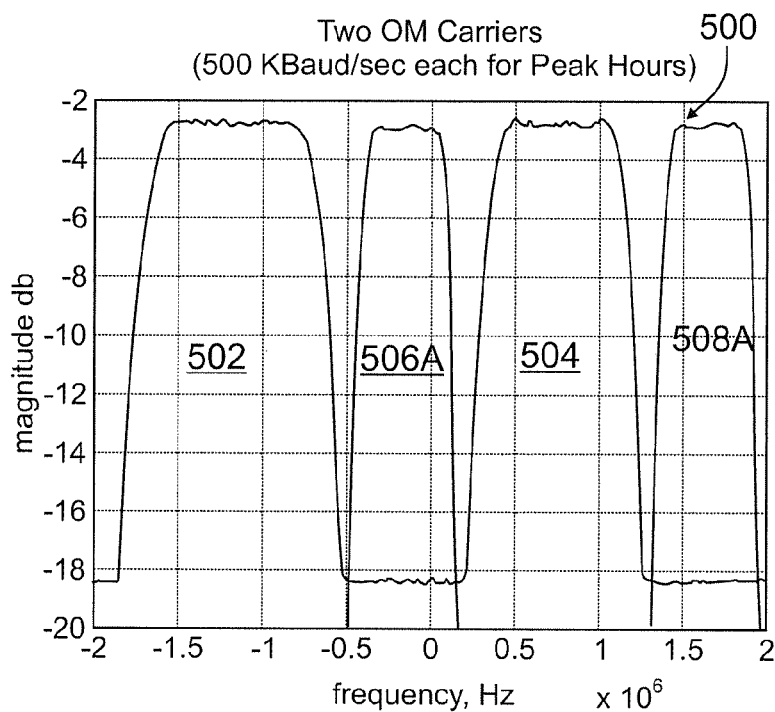
FIG. 5B shows the insertion of a second OM carrier in the second frequency gap adjacent the second signal.

Another approach to OM utilization providing an on-demand or on-time bandwidth expansion capability is illustrated in FIGS. 5A and 5B. FIG. 5A illustrates a pre-existing transponder spectrum profile 500 comprising a first signal 502 and a second signal 504 with a first unused frequency gap between them filled with an OM carrier 506A as in the previous example and a second unused frequency gap 508 adjacent second signal 504. It is assumed that the signals 502 and 504 belong to pre-existing users of the satellite transponder and are not moveable and may not be interfered with. This case is applicable to, for example, communications backhaul operations where during off-peak hours the bandwidth of the 506A signal is adequate and during peak hours additional bandwidth is required.

FIG. 5B shows the insertion of a second OM carrier 508A in the second frequency gap 508 adjacent the signal 504. As long as that gap is available and not subject to interference or elimination due to the expansion of the bandwidth used by the 504 (or some other) signal this bandwidth may be refarmed by the OM modem for use. As before, the data from a single OM connection may be distributed across multiple OM carriers for retransmission and then re-aggregated at the receiver. Users perceive the operation of a single logical modem despite the signal being spread over multiple carriers.

Figure 6A:
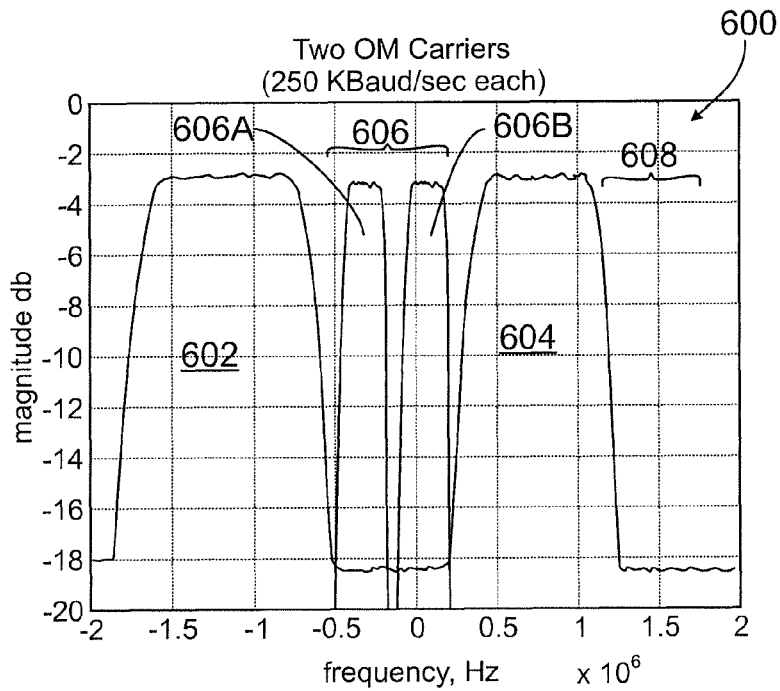
FIG. 6A illustrates a pre-existing transponder spectrum profile comprising a first signal and a second signal with a first unused frequency gap between them filled with a first OM carrier and a second OM carrier and a second unused frequency gap adjacent second signal.

Another approach to OM utilization provides an active interference mitigation capability and is illustrated in FIGS. 6A, 6B, 6C and 6D. FIG. 6A illustrates a pre-existing transponder spectrum profile 600 comprising a first signal 602 and a second signal 604 with a first unused frequency gap between them 606 filled with a first OM carrier 606A and a second OM carrier 606B and a second unused frequency gap 608 adjacent second signal 604. It is assumed that the signals 602 and 604 belong to pre-existing users of the satellite transponder and are not moveable and may not be interfered with.

Figure 6B:
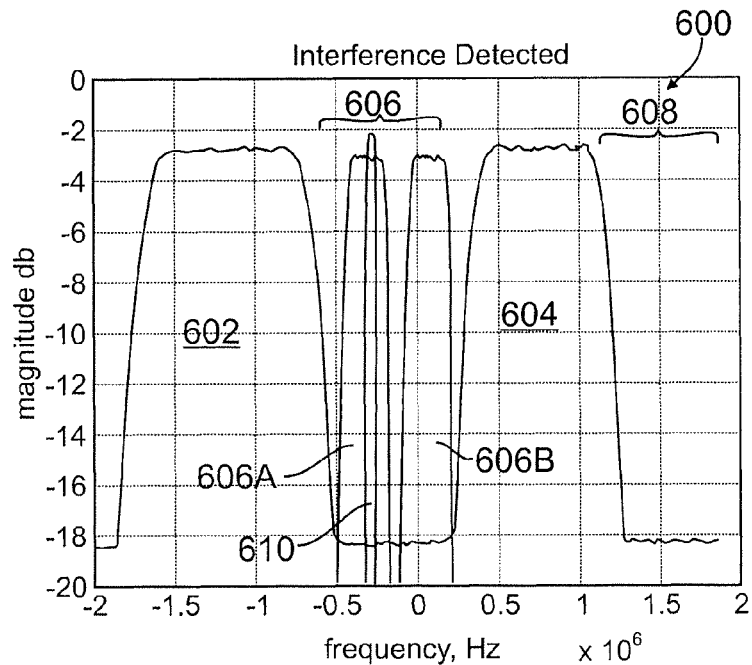
FIG. 6B illustrates the same scenario as FIG. 6A except that an interfering signal, such as a carrier or other signal has appeared in the first OM carrier passband.

FIG. 6B illustrates the same scenario as FIG. 6A except that an interfering signal 610, such as a carrier or other signal has appeared in the first OM carrier 606A passband. In order to recover from this situation a third OM carrier will be established, data transferred to the third OM carrier, and the first OM carrier 606A closed out.

Figure 6C:
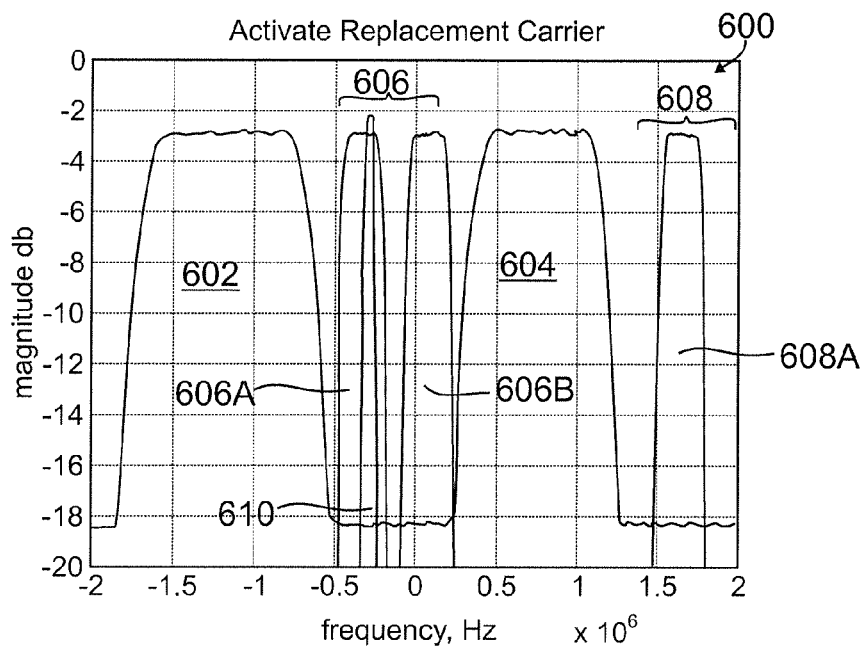
FIG. 6C illustrates the establishment of a third OM carrier in the second unused frequency gap adjacent signal.
Figure 6D:
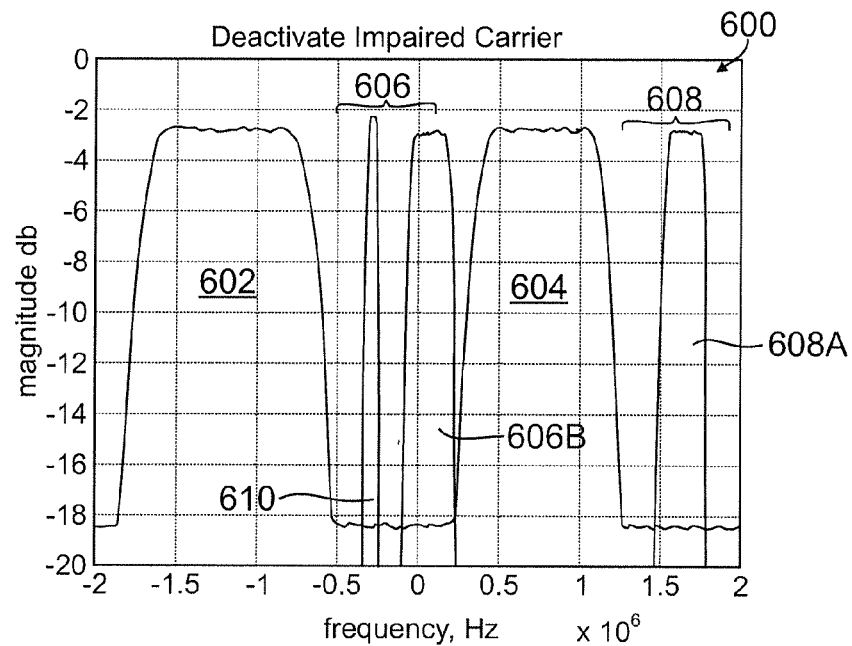
FIG. 6D illustrates the termination of the first OM carrier which is no longer useable due to the presence of the interfering signal.

FIG. 6C illustrates the establishment of a third OM carrier 608A in the second unused frequency gap 608 adjacent signal 604. FIG. 6D illustrates the termination of the first OM carrier 606A which is no longer useable due to the presence of the interfering signal 610.

Figure 7A:
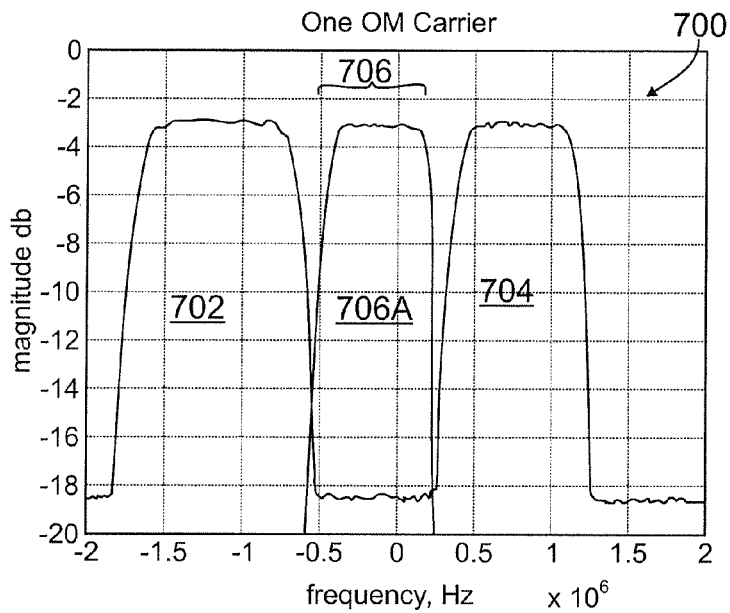
FIG. 7A illustrates a pre-existing transponder spectrum profile comprising a first signal and a second signal with a first unused frequency gap between them filled with a first OM carrier.
Figure 7B:
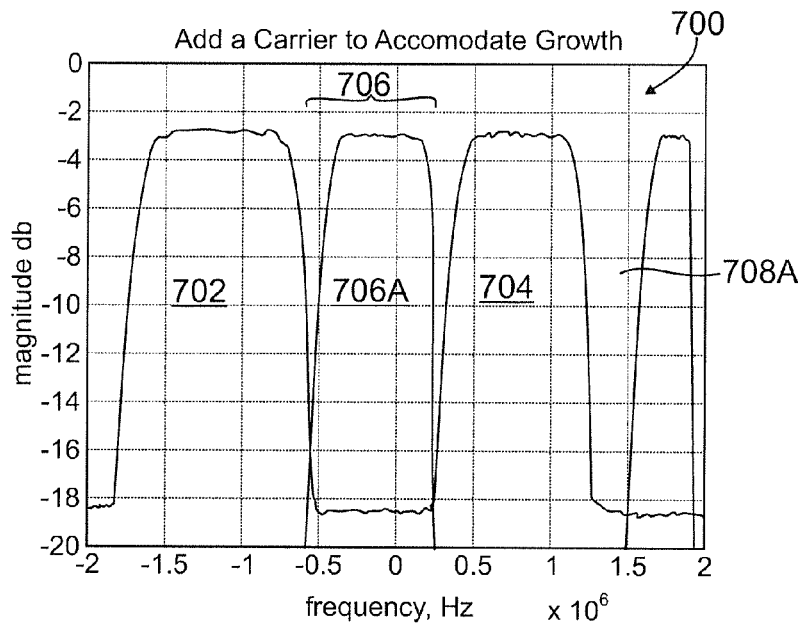
FIG. 7B illustrates the addition of a second OM carrier adjacent to second signal.
Figure 7C:
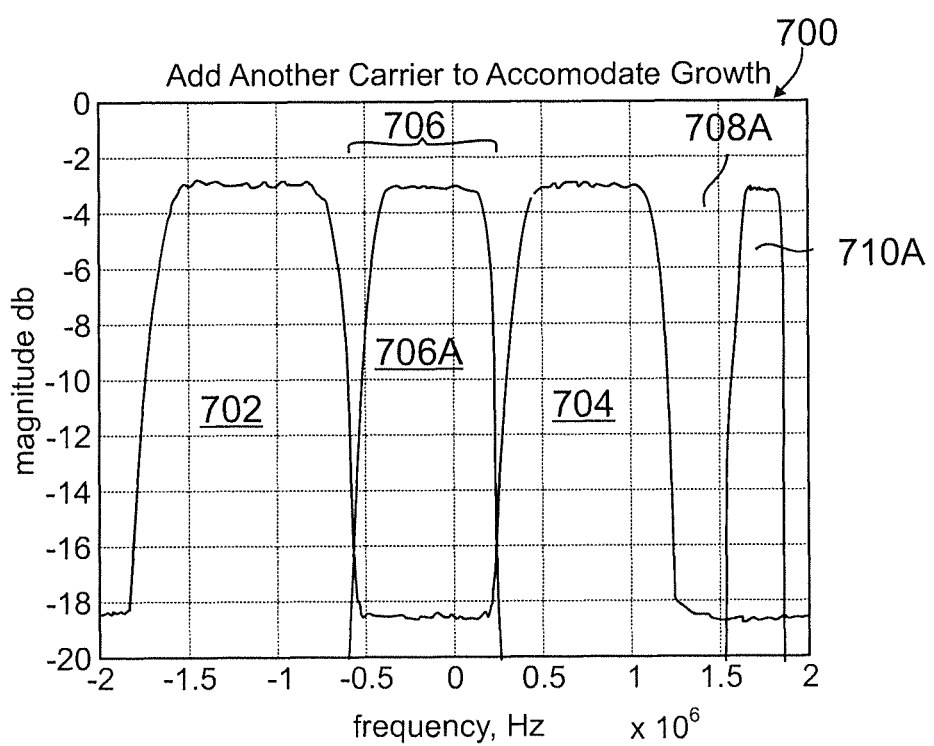
FIG. 7C illustrates the addition of a third OM carrier adjacent to the second OM carrier.

Yet another approach to OM utilization provides for seamless growth of available bandwidth and is illustrated in FIGS. 7A, 7B and 7C. FIG. 7A illustrates a pre-existing transponder spectrum profile 700 comprising a first signal 702 and a second signal 704 with a first unused frequency gap between them 706 filled with a first OM carrier 706A.

FIG. 7B illustrates the addition of a second OM carrier 708A adjacent to second signal 704. FIG. 7C illustrates the addition of a third OM carrier 710A adjacent to second OM carrier 708A.

Figure 8A:
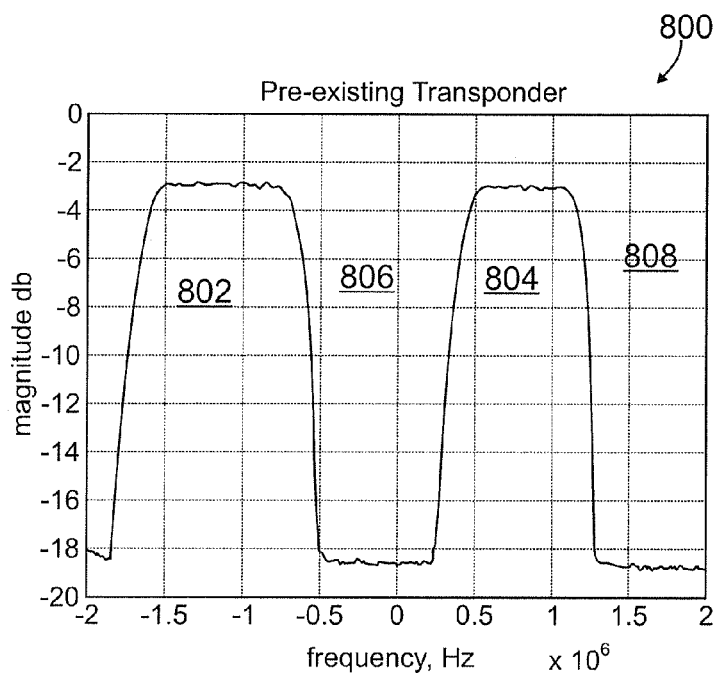
FIG. 8A illustrates a pre-existing transponder spectrum profile comprising a first signal and a second signal with a first unused frequency gap between them and a second unused frequency gap adjacent second signal.

Still another approach to OM utilization illustrated in FIGS. 8A-8G provides the ability of the OM to consolidate multiple carriers into a single wide carrier in order to make room on the transponder for other (less flexible) modem signals. FIG. 8A illustrates a pre-existing transponder spectrum profile 800 comprising a first signal 802 and a second signal 804 with a first unused frequency gap between them 806 and a second unused frequency gap 808 adjacent second signal 804.

Figure 8B:
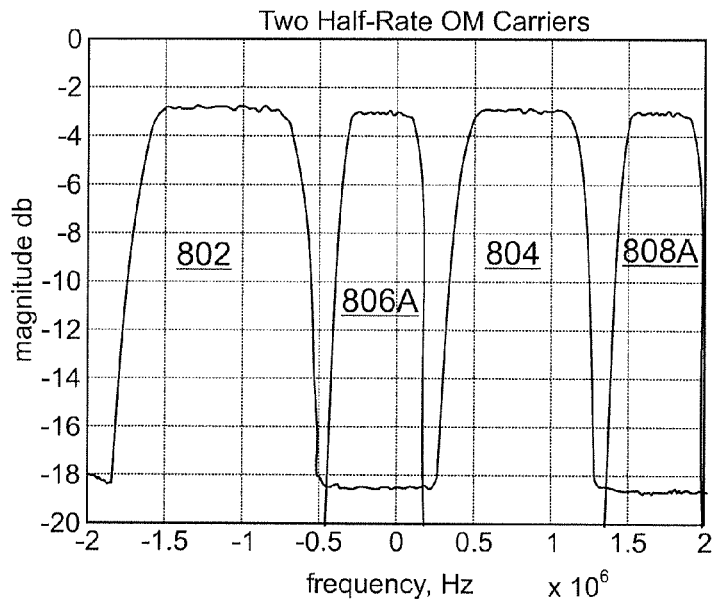
FIG. 8B illustrates the establishment of a first one-half rate OM carrier in the first gap and a second one-half rate OM carrier in the second gap.

FIG. 8B illustrates the establishment of a first one-half rate OM carrier 806A in first gap 806 and a second one-half rate OM carrier 808A in second gap 808.

Figure 8C:
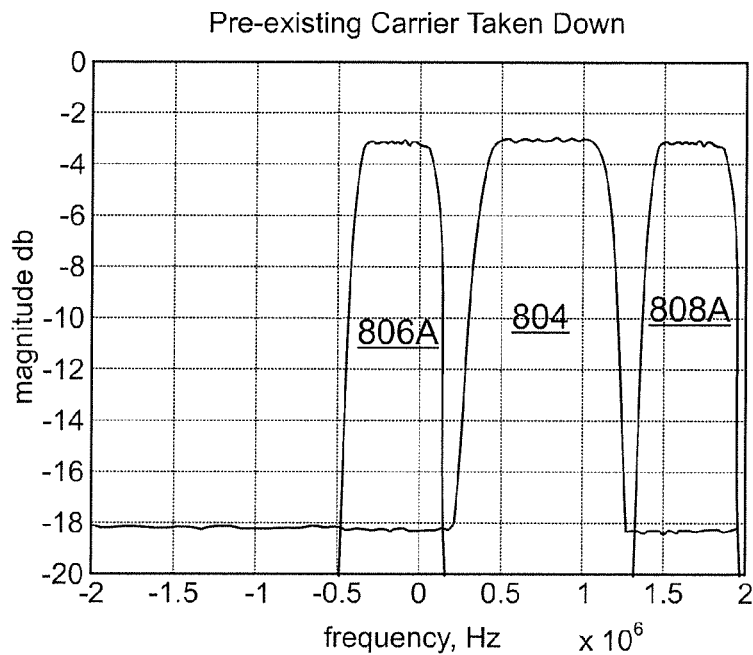
FIG. 8C illustrates the take down of the first carrier.

FIG. 8C illustrates the take down of first carrier 802.

Figure 8D:
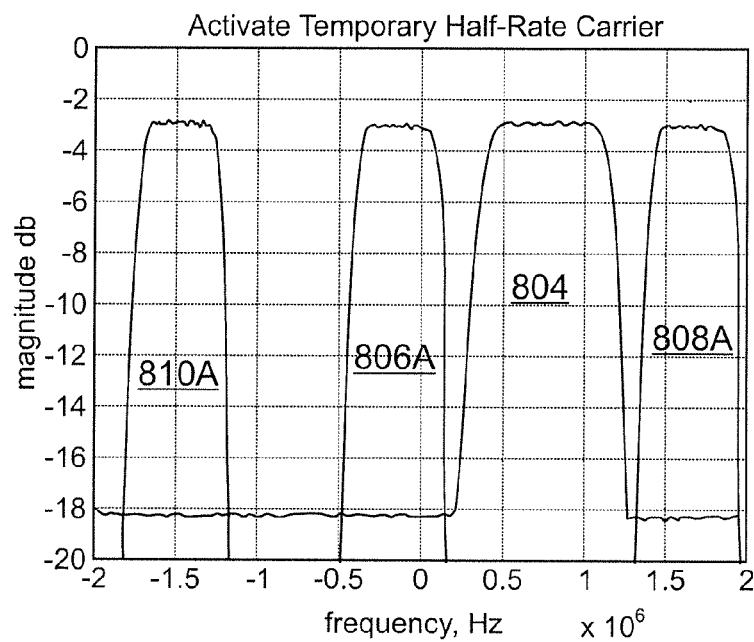
FIG. 8D illustrates the data from original first signal being temporarily carried by the two half-rate carriers and the establishment of a third temporary half-rate OM carrier in part of the bandwidth originally used by the first signal.

FIG. 8D illustrates the data from original signal 802 being temporarily carried by the two half-rate carriers 806A and 808A and the establishment of a third temporary half-rate OM carrier 810A in part of the bandwidth originally used by first signal 802.

Figure 8E:
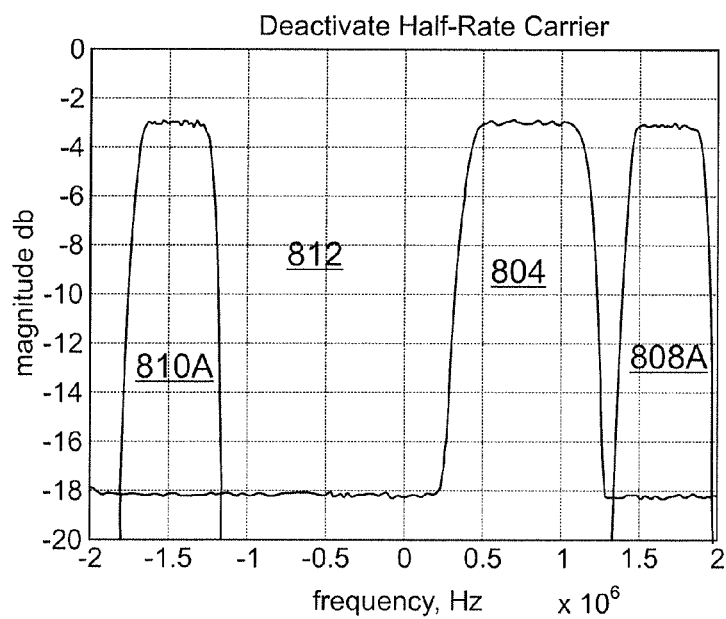
FIG. 8E illustrates deactivation of the first half-rate OM carrier, thereby clearing a gap for establishment of a full-rate OM carrier.

FIG. 8E illustrates deactivation of half-rate OM carrier 806A, thereby clearing a gap 812 for establishment of a full-rate OM carrier.

Figure 8F:
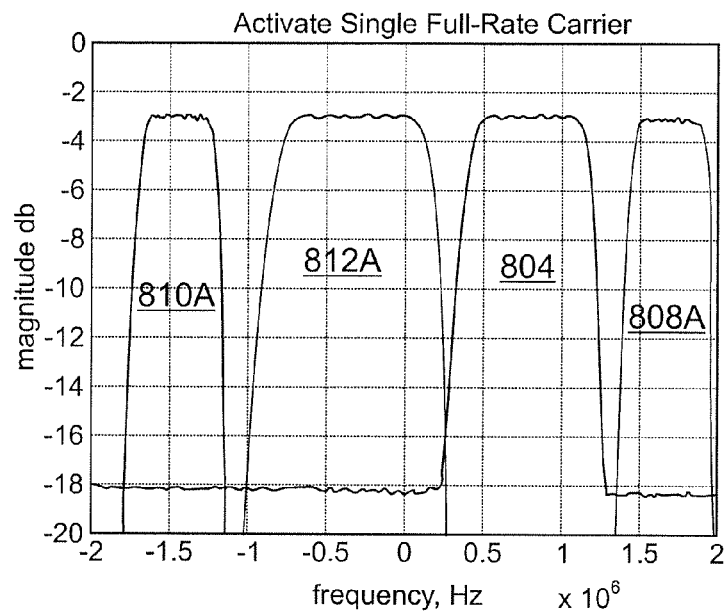
FIG. 8F illustrates activation of a new full-rate carrier in the gap cleared in FIG. 8E.

FIG. 8F illustrates activation of a new full-rate carrier 812A in the gap 812.

Figure 8G:
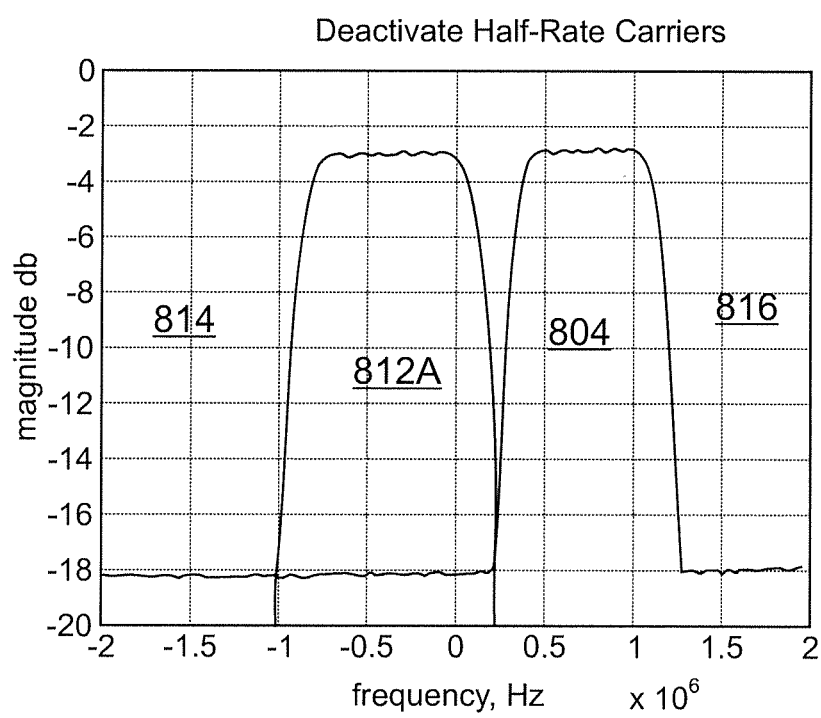
FIG. 8G illustrates deactivation of the remaining half-rate OM carriers and the transfer of their data to the new full-rate OM carrier, thus consolidating the bandwidth used and providing two larger gaps.

FIG. 8G illustrates deactivation of half-rate OM carriers 810A and 808A and the transfer of their data to full-rate OM carrier 812A, thus consolidating the bandwidth used and providing two larger gaps 814 and 816.

Note that it is intended that one gap or unused portion of a passband may encompass more than one gap or unused portion of a passband as that term is used in the appended claims.

Figure 9:
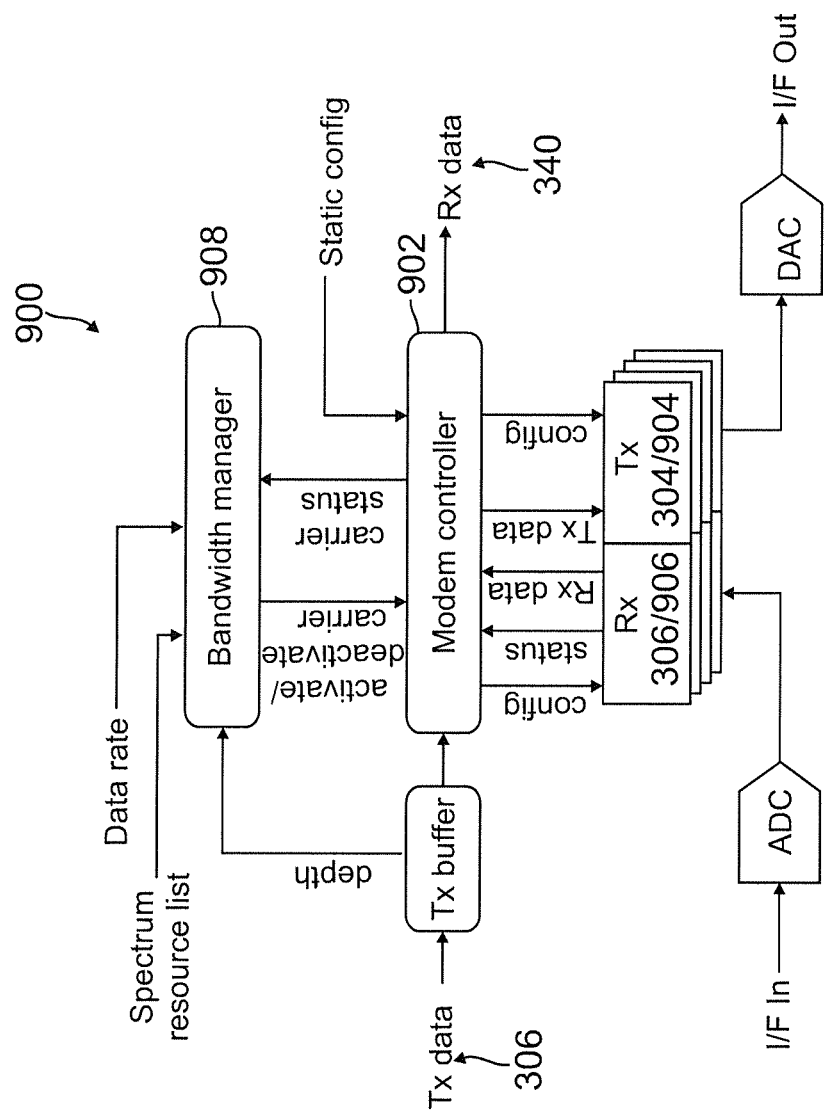
FIG. 9 is a block diagram of the system used for carrier management.

A block diagram of the system 900 used for carrier management is shown in FIG. 9. The "modem controller" 902, "TX" block 904 and "RX" block 906 correspond to the "modulator" 302 and "demodulator" 304 blocks of FIG. 3 discussed in more detail above. Also shown in FIG. 9 is the "bandwidth manager" 908 which is responsible for managing the overall data rate and spectrum utilization. The bandwidth manager 908 receives a "spectrum resource list" which corresponds to available spectrum. This may be manually or automatically specified. The bandwidth manager 908 also receives a data rate value corresponding to the data rate of the digital user data arriving at port 306. Carrier status information from the modem controller 902 is also provided to the bandwidth manager 908. In turn, the bandwidth manager 908 instructs the modem controller 902 when to startup and takedown carriers.

Figure 10:
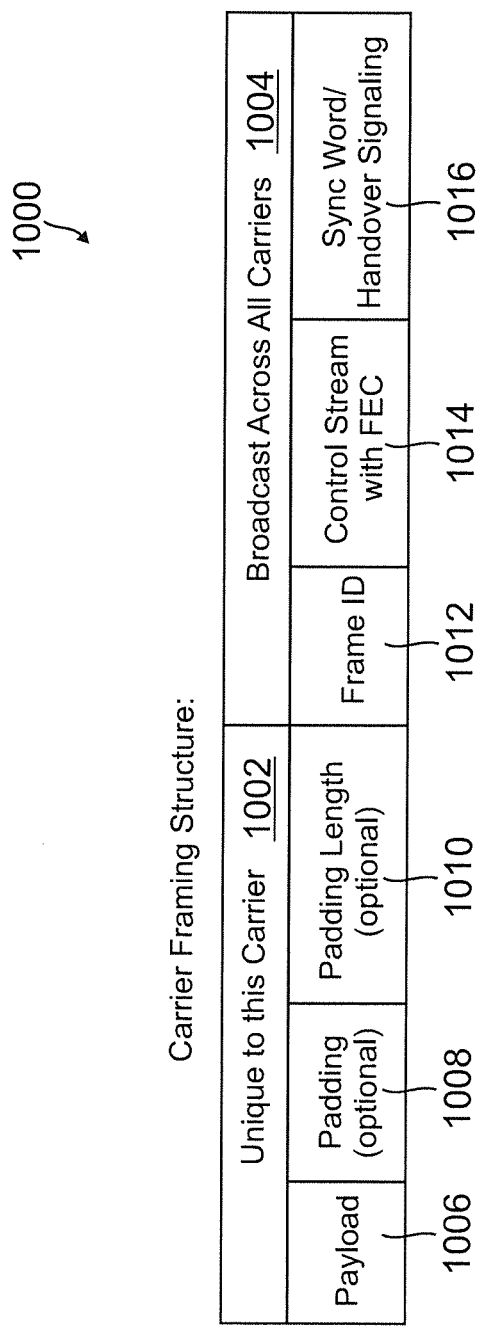
FIG. 10 is an example of a carrier framing structure.
Figure 11:
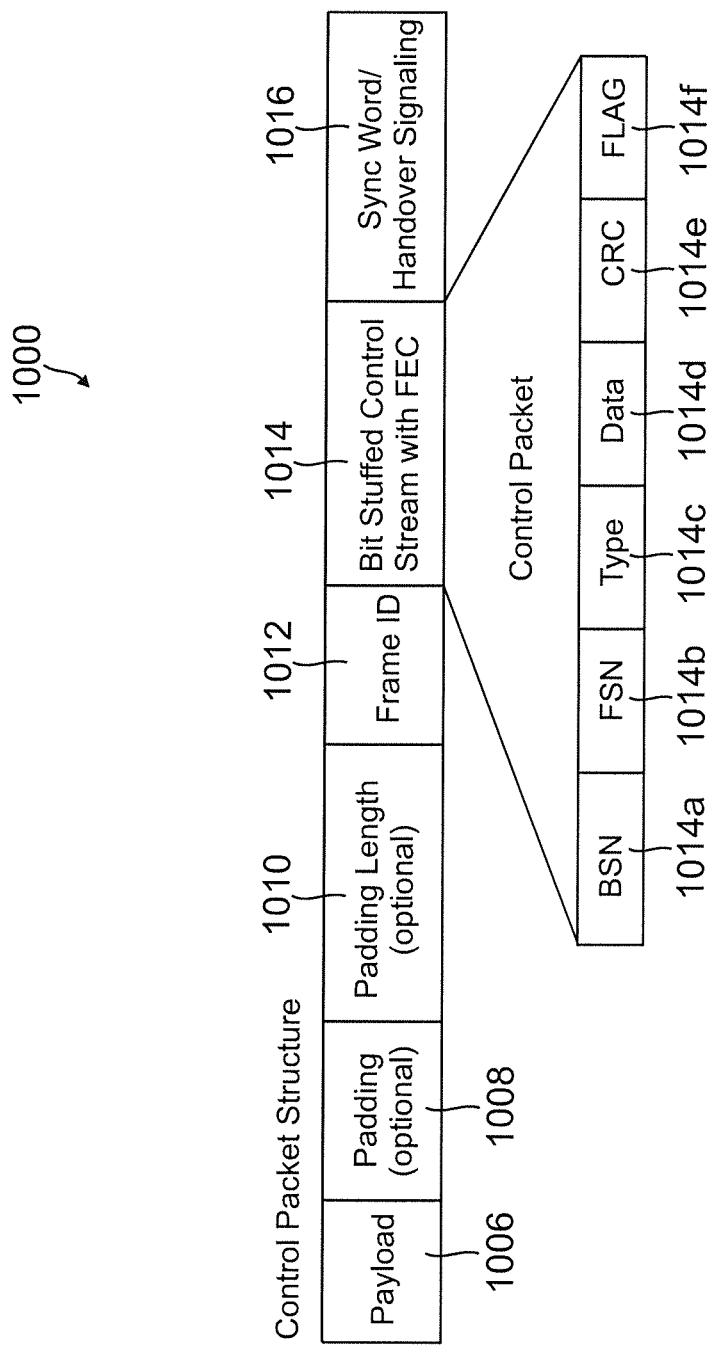
FIG. 11 is an example of a high-level data link control packet used in the control scheme.

In order to coordinate the startup and takedown of carriers (initiated either manually or automatically, and from either end of a full-duplex link) and to facilitate the proper seamless re-interleaving of user data that has been transmitted across different carriers, a framing scheme and associated control channels are used. The control channel description shown in FIGS. 10 and 11 is an example of such an approach. Those of ordinary skill in the art having the benefit of this disclosure will now realize that other approaches are possible and contemplated herein.

FIG. 10 is an example of a carrier framing structure which may be used in an embodiment. The framing structure 1000 of FIG. 10 includes information unique to a particular carrier (1002) and information broadcast over all carriers (1004).

The unique carrier data 1002 includes a payload field (1006), an optional padding field (1008) and an optional padding length field (1010). The payload 1006 comprises bits to be passed on for follow on processing (de-interleaving). If this channel is not currently in use then this field is also used for additional handover signaling. The optional padding field 1008 is an optional field that is used for synchronous data transmission. The optional padding length field 1010 is an optional field used for synchronous data transmission.

The information broadcast over all carriers 1004 includes a frame identification field (1012), a control stream with FEC field (1014) and a sync word/handover signaling field 1016. The frame identification field 1012 includes a frame identifier for aligning data from different carriers. The control stream FEC field 1014 includes a bit stuffed packet stream used for command and control operations. This field is protected by its own FEC. The sync word/handover signal field 1016 is used for 3 functions:
1. Identify frame boundaries;
2. Resolve phase ambiguity; and
3. Handover signaling.

FIG. 11 is an example of a high-level data link control packet structure 1014 which may be used in the data link control scheme in accordance with an embodiment. The control stream field is a bit stuffed packet stream that is used for command and control between two modems. To ensure the integrity of this control stream, selective repeat ARQ with windowing may be used. Note: the control packet field 1014 is of fixed length and will only contain portions of a control packet at one time. In one embodiment there are six sub-fields in the control packet field 1014. These are: BSN (1014a): backward sequence number used for acknowledging packets in the ARQ (Automatic Repeat-reQuest, an error control mechanism for data transmission) scheme; FSN (1014b): forward sequence number associated with this control packet for ARQ; Type (1014c): number specifying the type of control message. The signal type will be used to identify the format and size of the data field; Data (1014d): a control message payload (See 'Control Messages' below); CRC (1014e): a CRC (cyclic redundancy check) check for the packet; FLAG (1014f): a flag channel used as discussed above.

Control Messages. Control message used in accordance with one embodiment are as follows:
1. Lock Status: Used to send lock status updates for one or more carrier channels.
2. LockQuery: Actively request the lock status of one or more carriers.
3. LinkStatusQuery: Requests information on the state of the aggregate data stream.
4. LinkStatus: Sends status information on the aggregate stream.
5. AddCarrier: Sent when it is time to bring up a new carrier signal. The specs for the new carrier are also contained in this message.
6. RemoveCarrier: Sent to take down an active carrier.
7. HandoverAck: Message used to acknowledge that a carrier was successfully added or deleted.
8. IdleAck: Used when there are no buffered return messages to piggyback an ARQ acknowledgement.

Control Channel Overhead

The presence of the framing and control channel imposes an efficiency penalty. The efficiency is defined as the user data throughput rate in the presence of framing/control divided by the user data throughput rate if there were no framing/control. Under reasonable assumptions, the overhead due to the framing and control channel is as follows:
1. Homogenous configurations (all carriers have the same baud rate): 98.7%=0.06 dB EbN0;
2. Heterogeneous configurations (mixed baud rates): 94% to 98%=0.27 dB to 0.09 dB EbN0.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A modem for communicating digital user data, the modem comprising:
   an input port configured to receive the digital user data;
   an output port configured to transmit a modem output signal;
   the modem configurable to:
      initially establish at least a first carrier at a first carrier frequency and bandwidth of the modem output signal;
      transmit the digital user data over the at least a first carrier;
      subsequently establish at least one second carrier at a second carrier frequency and bandwidth of the modem output signal;
      initially transmit pilot data over the second carrier for a period of time;
      stop transmitting pilot data after the period of time; and
      after the period of time divide the digital user data among the first carrier and the second carrier.

2. A method for communicating digital user data, the method comprising:
   receiving the digital user data with an input port of a modem;
   configuring the modem to initially establish at least a first carrier at a first carrier frequency and bandwidth of a modem output signal;
   configuring the modem to subsequently establish at least one second carrier at a second carrier frequency and bandwidth of the modem output signal;
   transmitting pilot data over the second carrier for a period of time; and
   subsequent to the period of time, dividing the digital user data among the at least first carrier and the second carrier.

3. The method of claim 2, further comprising:
   receiving the pilot data during the period of time;
   determining an error rate for the received pilot data; and
   ending the period of time when the error rate is less than a predetermined threshold.

4. The method of claim 2, wherein:
   the second carrier is established in response to a particular demand for data bandwidth capacity.

5. The method of claim 2, further comprising:
   establishing a third carrier in the modem output signal.

6. The method of claim 5, wherein:
   the third carrier is established in response to a particular demand for data bandwidth capacity.

7. The method of claim 2, further comprising:
   detecting interference with the first carrier; and
   transferring the digital user data transmitted using the first carrier to the second carrier.

8. The method of claim 2, further comprising:
   detecting interference with the first carrier;
   establishing a third carrier in the modem output signal in response to the detecting; and
   transferring the digital user data transmitted using the first carrier and the second carrier to the second carrier and the third carrier.

9. The method of claim 8, further comprising:
   de-establishing the first carrier.

10. The method of claim 2, further comprising:
    establishing a third carrier in the modem output signal; and transferring the digital user data transmitted using the first carrier and the second carrier to the third carrier.

11. The method of claim 10, further comprising:
de-establishing the first carrier and the second carrier.

12. A method for communicating digital user data, the method comprising:
receiving the digital user data with an input port of a modem;
configuring the modem to establish at least first and second carriers at corresponding first and second carrier frequencies and bandwidths of a modem output signal;
transmitting the digital user data from the modem with the at least a first and second carrier of the modem output signal;
subsequently configuring the modem to de-establish the second carrier;
prior to de-establishing the second carrier, transmitting the digital user data over the at least a first carrier and transmitting pilot data over the second carrier for a period of time; and
subsequent to the period of time, de-establishing the second carrier.

13. A system for communicating digital user data from a first location to a second location via at least one transponder, the system comprising:
a first modem associated with the first location configured to receive the digital user data at an input port, the first modem configurable to initially establish at least a first carrier at a first carrier frequency and bandwidth of the at least one transponder and to transmit the digital user data over the at least a first carrier via the at least one transponder; and
a second modem associated with the second location configured to receive the user data via the at least one transponder from the first modem, the second modem configurable to initially receive at least the first carrier at the first carrier frequency and bandwidth,
wherein the first and second modems are configurable to subsequently establish at least one second carrier at a second carrier frequency and bandwidth of the at least one transponder and to initially transmit pilot data from the first modem to the second modem and then to stop transmitting pilot data and to divide the digital user data among the first carrier and the second carrier.

14. The system of claim 13, wherein the at least one transponder is a satellite transponder.

15. The system of claim 13, wherein the first modem is further configured to transmit configuration information for the second modem to the second modem over the at least one transponder and the second modem is configured to utilize the configuration information so transmitted to configure the second modem to receive.

16. A method for communicating digital user data from a first location to a second location via at least one transponder, the method comprising:
receiving the digital user data at the first location with an input port of a first modem;
configuring the first modem to initially establish at least a first carrier at a first carrier frequency and bandwidth of the at least one transponder;
transmitting the digital user data with the first modem over the at least a first carrier via the at least one transponder;
receiving the digital user data with a second modem associated with the second location, the second modem being configured to receive the digital user data via the at least one transponder from the first modem;
configuring the second modem to initially receive at least the first carrier at the first carrier frequency and bandwidth;
subsequently configuring the first and second modems to establish at least one second carrier at a second carrier frequency and bandwidth of the at least one transponder;
transmitting pilot data from the first modem to the second modem over the second carrier for a period of time; and
subsequent to the period of time, dividing the digital user data among the at least first carrier and the second carrier.

17. The method of claim 16, wherein the at least one transponder is a satellite transponder.

18. The method of claim 16, further comprising:
transmitting configuration information for the second modem from the first modem to the second modem over the at least one transponder; and
configuring the second modem in accordance with the configuration information.

19. The method of claim 18, wherein the configuration information includes information identifying the second carrier frequency.

20. The method of claim 19, wherein the configuration information further includes information identifying the second carrier bandwidth.

21. A method for communicating digital user data from a first location to a second location via at least one transponder, the method comprising:
receiving the digital user data at the first location with an input port of a first modem;
configuring the first modem to establish at least first and second carriers at corresponding first and second carrier frequencies and bandwidths of the at least one transponder;
transmitting the digital user data from the first modem with the at least a first and second carrier via the at least one transponder;
receiving the digital user data with a second modem associated with the second location, the second modem being configured to receive the digital user data via the at least one transponder from the first modem;
configuring the second modem to receive at least the first and second carriers at the corresponding first and second carrier frequencies and bandwidths;
subsequently configuring the first and second modems to de-establish the second carrier;
prior to de-establishing the second carrier, transmitting the digital user data over the at least a first carrier via the at least one transponder and transmitting pilot data over the second carrier via the at least one transponder for a period of time; and
subsequent to the period of time, de-establishing the second carrier.

22. The method of claim 21, wherein the at least one transponder is a satellite transponder.

23. The method of claim 21, further comprising:
transmitting configuration information for the second modem from the first modem to the second modem over the at least one transponder; and
configuring the second modem in accordance with the configuration information.

24. The method of claim 23, wherein the configuration information includes information identifying the second carrier frequency.

25. The method of claim 24, wherein the configuration information further includes information identifying the second carrier bandwidth.

26. A method for communicating digital user data from a first modem to a second modem via a satellite transponder having a passband, the method comprising:
- establishing a first carrier having a first frequency and bandwidth in a first portion of the transponder passband;
- initially transmitting the digital user data using the first carrier;
- subsequently establishing a second carrier having a second frequency and bandwidth in a second portion of the transponder passband;
- after establishment of the second carrier, initially transmitting pilot data over the second carrier for a period of time; and
- after the period of time ceasing the transmission of pilot data and dividing the digital user data among the first carrier and the second carrier for transmission.

27. The method of claim 26, further comprising:
- receiving the pilot data during the period of time;
- determining an error rate for the received pilot data;
- when the error rate is less than a predetermined threshold, ending the period of time.

28. The method of claim 26, wherein:
- the second carrier is established in response to a particular demand for data bandwidth capacity.

29. The method of claim 26, further comprising:
- establishing a third carrier in a third unused portion of a transponder passband.

30. The method of claim 29, wherein:
- the third carrier is established in response to a particular demand for data bandwidth capacity.

31. The method of claim 26, further comprising:
- detecting interference with the first carrier; and
- transferring the digital user data transmitted using the first carrier to the second carrier.

32. The method of claim 26, further comprising:
- detecting interference with the first carrier;
- in response to the detecting, establishing a third carrier in a third unused portion of a transponder passband; and
- transferring the digital user data transmitted using the first carrier and the second carrier to the second carrier and the third carrier.

33. The method of claim 32, further comprising:
- de-establishing the first carrier.

34. The method of claim 26, further comprising:
- establishing a third carrier in a third unused portion of a transponder passband; and
- transferring the digital user data transmitted using the first carrier and the second carrier to the third carrier.

35. The method of claim 34, further comprising:
- de-establishing the first carrier and the second carrier.

36. The method of claim 26, wherein:
- the first carrier and the second carrier are established on the same transponder.

37. The method of claim 26, wherein:
- the first carrier and the second carrier are established on distinct different transponders.

38. A system for communicating digital user data from a first modem to a second modem via a satellite transponder having a passband, the system comprising:
- means associated with the first modem for establishing a first carrier having a first frequency and bandwidth in a first portion of the transponder passband;
- means associated with the first modem for initially transmitting the digital user data using the first carrier;
- means for subsequently establishing a second carrier having a second frequency and bandwidth in a second portion of the transponder passband;
- means operable after establishment of the second carrier for initially transmitting pilot data over the second carrier for a period of time; and
- means operable after the period of time for ceasing the transmission of the pilot data and dividing the digital user data among the first carrier and the second carrier for transmission.

39. The system of claim 38, further comprising:
- means associated with the second modem for receiving the pilot data during the period of time;
- means associated with the second modem for determining an error rate for the received pilot data; and
- means operable when the error rate is less than a predetermined threshold for ending the period of time.

40. The system of claim 38, wherein:
- the second carrier is established in response to a particular demand for data bandwidth capacity.

41. The system of claim 38, further comprising:
- means associated with the first modem for establishing a third carrier in a third unused portion of a transponder passband.

42. The system of claim 41, wherein:
- the third carrier is established in response to a particular demand for data bandwidth capacity.

43. The system of claim 38, further comprising:
- means for detecting interference with the first carrier; and
- means for transferring the digital user data transmitted using the first carrier to the second carrier.

44. The system of claim 38, further comprising:
- means for detecting interference with the first carrier;
- means responsive to the means for detecting for establishing a third carrier in a third unused portion of a transponder passband; and
- means for transferring the digital user data transmitted using the first carrier and the second carrier to the second carrier and the third carrier.

45. The system of claim 44, further comprising:
- means for de-establishing the first carrier.

46. The system of claim 38, further comprising:
- means for establishing a third carrier in a third unused portion of a transponder passband; and
- means for transferring the contents of the digital user data transmitted using the first carrier and the second carrier to the third carrier.

47. The system of claim 46, further comprising:
- means for de-establishing the first carrier and the second carrier.

48. The system of claim 38, wherein:
- the first carrier and the second carrier are established on the same transponder.

49. The method of claim 38, wherein:
- the first carrier and the second carrier are established on distinct different transponders.

* * * * *